United States Patent
Kondo (12) 
(10) Patent No.: US 6,292,655 B1
(45) Date of Patent: Sep. 18, 2001

(54) SELECTIVE CALLING RADIO-RECEIVER AND METHOD OF RECEIVING SELECTIVE CALLING RADIO SIGNAL

(75) Inventor: Hisashi Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,539

(22) Filed: May 27, 1999

(30) Foreign Application Priority Data

May 29, 1998 (JP) .................................................. 10-148734

(51) Int. Cl.[7] ....................................................... H04Q 7/00
(52) U.S. Cl. ......................... 455/295; 340/7.42; 375/271; 375/334
(58) Field of Search .................................. 340/7.25, 7.42, 340/825.52; 455/63, 67.3, 295, 296, 67.1; 375/271, 272, 334

(56) References Cited

U.S. PATENT DOCUMENTS 5,414,736 * 5/1995 Hasegawa et al. ................... 375/334
5,854,808 * 12/1998 Peponides et al. ................... 375/224

FOREIGN PATENT DOCUMENTS

| 60-146557 | 8/1985 | (JP) . |
| 3-69238 | 3/1991 | (JP) . |
| 4-11431 | 1/1992 | (JP) . |
| 4-123550 | 4/1992 | (JP) . |
| 5-30009 | 2/1993 | (JP) . |
| 8-201544 | 8/1996 | (JP) . |
| 8-237314 | 9/1996 | (JP) . |
| 8-289345 | 11/1996 | (JP) . |
| 10-93641 | 4/1998 | (JP) . |

* cited by examiner

Primary Examiner—Lee Nguyen
(74) Attorney, Agent, or Firm—McGuireWoods LLP (57) ABSTRACT

There is provided a selective calling radio-receiver including (a) a demodulator demodulating a received selective calling radio signal, (b) a waveform-shaper shaping waveform of a demodulation signal transmitted from the demodulator, (c) a data-receiving signal generator generating a data-receiving signal which is in synchronization with the modulation signal having a waveform having been shaped by the waveform-shaper, and which has a plurality of pulses per a symbol term, (d) a data-receiver receiving the demodulation signal at every pulse of the data-receiving signal, (e) a sign discriminator discriminating a sign of received data at every symbol, based on data having been received in the data-receiver, and (f) a processor processing the received data a sign of which has been discriminated by the sign discriminator. The selective calling radio receiver ensures receiving a signal without an error even in an overlapping area where selective calling radio signals transmitted from a plurality of base stations overlap one another in a common service area.

14 Claims, 7 Drawing Sheets

SELECTIVE CALLING RADIO-RECEIVER AND METHOD OF RECEIVING SELECTIVE CALLING RADIO SIGNAL

BACKGROUND OF THE INVENTION

1. Field of the Invention

The invention relates to a selective calling radio-receiver, and more particularly to a selective calling radio-receiver receiving and demodulating a selective calling radio-signal, and displaying message included in the received radio-signal.

The invention also relates to a method of receiving a selective calling radio signal in a selective calling radio-receiver, and more particularly to a method of receiving a selective calling radio signal in a selective calling radio-receiver receiving and demodulating a selective calling radio-signal, and displaying message included in the received radio-signal.

2. Description of the Invention

There have been suggested various selective calling radio-receivers which receives a selective calling radio signal and demodulates the received selective calling radio signal for displaying message indicated in the received selective calling radio signal. For instance, Japanese Unexamined Patent Publication No. 8-289345 has suggested such a selective calling radio-receiver.

Such a conventional selective calling radio-receiver as mentioned above generally operates as follows. First, a selective calling radio-receiver receives a selective calling radio signal transmitted from a caller through a base station in a certain signal system such as ERMES, and demodulates the thus received selective calling radio signal. Then, the received selective calling radio signal is shaped in a waveform thereof. Thereafter, data is introduced into the selective calling radio-receiver in accordance with a timing clock transmitted in synchronization with the received data. After a calling number and a message signal have been obtained, a decoder compares the thus decoded calling number to a calling number of the selective calling radio-receiver, stored in a memory. If they are coincident with each other, an annunciator such as a speaker annunciates that a call has been received. A message indicated in the received selective calling radio signal is displayed in a display screen.

As a service area of a base station for a selective calling radio-receiver has been expanded, there has been increased an overlapping area where selective calling radio signals transmitted from a plurality of base stations overlap one another in a common service area. In such an overlapping area, there occurs level fluctuation in a bit signal due to phasing, a difference in delay among transmitting stations, and a difference in a frequency.

A conventional selective calling radio receiver is designed to receive only a point in a center level in a demodulated signal for receiving data included in the demodulated signal. Hence, noises are disadvantageously added to a demodulated signal in a center level thereof, or data error tends to occur due to level fluctuation in the above-mentioned overlapping area, both causing reduction in signal receiving rate.

Japanese Unexamined Patent Publication No. 5-30009 has suggested a radio signal receiver including a timing generator which carried out sampling three or more times for a bit of a demodulated signal having a rectangular waveform, and a controller receiving sampled data, converting the sampled data to actual radio data, and compensating for a sampling timing based on the sampled data.

Japanese Unexamined Patent Publication No. 8-201544 has suggested a selective calling radio-receiver including means for measuring a period of time associated with data "1" and "0", means for adding time with ½ of the measured period of time being used as an initial value, and means for checking the time.

Japanese Unexamined Patent Publication No. 3-69238 has suggested a selective calling radio-receiver including a detecting and demodulating circuit which demodulates a received signal and outputs a base band signal, a comparator turning the base band signal into a binary signal, and outputting the binary signal, a clock reproducing circuit which reproduces a first clock signal having the same frequency as a bit rate of data to be transmitted, and generates a second clock signal having a higher rate than that of the first clock signal, a multi-timing discriminator which samples the binary signal in accordance with the second clock signal, makes a decision by majority to a plurality of sampling points among the sampled data, and outputs a signal obtained as a result of the decision by majority, and a latch circuit which latches the signal transmitted from the multi-timing discriminator, in accordance with the first clock signal, and outputs the latched signal as reproduced digital data.

Japanese Unexamined Patent Publications Nos. 60-146557, 4-11431 and 4-123550 have suggested selective calling radio-receivers which receive a selective calling radio signal and demodulates the received signal, and displays message included in the received signal, in a display screen.

SUMMARY OF THE INVENTION

In view of the above-mentioned problems in the conventional selective calling radio-receivers, it is an object of the present invention to provide a selective calling radio-receiver which is capable of receiving data without an error in such an overlapping area as mentioned above.

It is also an object of the present invention to provide a method of receiving a selective calling radio signal without an error in such an overlapping area as mentioned above.

In one aspect, there is provided a selective calling radio-receiver including (a) a demodulator demodulating a received selective calling radio signal, (b) a waveform-shaper shaping waveform of a demodulation signal transmitted from the demodulator, (c) a data-receiving signal generator generating a data-receiving signal which is in synchronization with the modulation signal having a waveform having been shaped by the waveform-shaper, and which has a plurality of pulses per a symbol term, (d) a data-receiver receiving the demodulation signal at every pulse of the data-receiving signal, (e) a sign discriminator discriminating a sign of received data at every symbol, based on data having been received in the data-receiver, and (f) a processor processing the received data a sign of which has been discriminated by the sign discriminator.

It is preferable that the sign discriminator determines a sign in the greatest number among signs of data having been received from the data-receiver in a symbol term, as a sign of data having been received in the symbol term.

For instance, the data-receiving signal generator may be designed to include (c1) a synchronization clock generator generating a synchronization signal having a rectangular waveform produced in every symbol period, based on the demodulation signal having a waveform having been shaped by the waveform-shaper, and (c2) a timing signal generator generating a pulse row as the data-receiving signal in a certain period of time around a time associated with a level-turning point of the synchronization signal in a symbol term, the pulse row including a plurality of pulses.

For instance, the timing signal generator may be designed to include (c21) a memory storing therein at least one of information about a timing at which data is received and information about the number of data, (c22) a first controller varying the timing stored in the memory, and (c23) a timing generator generating the data-receiving signal having a pulse width and a pulse period both determined in accordance with the information.

For instance, the timing signal generator may be designed to include (c21) a memory storing therein at least one of information about a timing at which data is received and information about the number of data, (c22) a second controller varying the number of data stored in the memory, and (c23) a timing generator generating the data-receiving signal having a pulse by the number determined in accordance with the information.

When the selective calling radio signal is a binary FSK signal, the waveform-shaper may be designed to include (b1) a reference voltage source generating a reference voltage, and (b2) a comparator comparing the demodulation signal to the reference voltage in level to thereby form a signal having a rectangular waveform, and outputting the signal as a demodulation signal having a shaped waveform.

When the selective calling radio signal is a four-valued FSK signal, the waveform-shaper may be designed to include (b1) first, second and third reference voltage sources generating first, second and third reference voltages having different levels from one another, (b2) a first comparator comparing the demodulation signal in level to the first reference voltage to thereby obtain a first signal having a rectangular waveform, and outputting the first signal for MSB as a demodulation signal having a shaped waveform, (b3) a second comparator comparing the demodulation signal in level to the second reference voltage, the second reference voltage being greater in level than the first reference voltage, (b4) a third comparator comparing the demodulation signal in level to the third reference voltage, the third reference voltage being smaller in level than the first reference voltage, and (b5) a logic circuit transmitting a second signal for LSB as a demodulation signal having a shaped waveform, the second signal having a first level when the demodulation signal transmitted from the demodulator has a level intermediate between the second and third reference voltages, and having a second level when the demodulation signal transmitted from the demodulator has a level greater than the second reference voltage or smaller than the third reference voltage, the data-receiver separately receiving the first and second signals for every pulse of the data-receiving signal.

In another aspect, there is provided a method of receiving a selective calling radio signal, including the steps of (a) demodulating a received selective calling radio signal, (b) shaping a waveform of the thus demodulated selective calling radio signal, (c) generating a data-receiving signal which is in synchronization with the demodulated selective calling radio signal and which has a plurality of pulses per a symbol term, (d) receiving the selective calling radio signal at every pulse of the data-receiving signal, (e) discriminating a sign of received data at every symbol, based on the selective calling radio signal having been received in the step (d), and (f) processing the received data a sign of which has been discriminated in the step (e).

For instance, a sign in the greatest number among signs of data having been received in a symbol term is determined as a sign of data having been received in the symbol term, in the step (e).

It is preferable that the step (c) includes (c1) generating a synchronization signal having a rectangular waveform produced in every symbol period, and (c2) generating a pulse row as the data-receiving signal in a certain period of time around a time associated with a level-turning point of the synchronization signal in a symbol term, the pulse row including a plurality of pulses.

It is preferable that the step (c2) includes (c21) storing at least one of information about a timing at which data is received and information about the number of data, (c22) varying the timing, and (c23) generating the data-receiving signal having a pulse width and a pulse period both determined in accordance with the information.

It is preferable that the step (c2) includes (c21) storing at least one of information about a timing at which data is received and information about the number of data, (c22) varying the number of data, and (c23) generating the data-receiving signal having a pulse by the number determined in accordance with the information.

When the selective calling radio signal is a binary FSK signal, it is preferable that the step (b) includes (b1) generating a reference voltage, and (b2) comparing the demodulated selective calling radio signal to the reference voltage in level to thereby form a signal having a rectangular waveform, and outputting the signal as a demodulation signal having a shaped waveform.

When the selective calling radio signal is a four-valued FSK signal, the step (b) includes (b1) generating first, second and third reference voltages having different levels from one another, (b2) comparing the selective calling radio signal in level to the first reference voltage to thereby obtain a first signal having a rectangular waveform, and outputting the first signal for MSB as a demodulation signal having a shaped waveform, (b3) comparing the selective calling radio signal in level to the second reference voltage, the second reference voltage being greater in level than the first reference voltage, (b4) comparing the selective calling radio signal in level to the third reference voltage, the third reference voltage being smaller in level than the first reference voltage, and (b5) transmitting a second signal for LSB as a demodulation signal having a shaped waveform, the second signal having a first level when the demodulation signal has a level intermediate between the second and third reference voltages, and having a second level when the demodulation signal has a level greater than the second reference voltage or smaller than the third reference voltage, the first and second signals being separately received for every pulse of the data-receiving signal.

The advantages obtained by the aforementioned present invention will be described hereinbelow.

In accordance with the present invention, a demodulated signal having a shaped waveform is received at every pulse of a data-receiving signal including a plurality of pulses per a symbol period, and a sign of received data is determined based on the thus received demodulated signal. Hence, it would be possible to accurately receive a selective calling radio signal even when there bit synchronization is not established due to phasing and/or a difference in delay in transmitted signals in an overlapping area, when data is unstably received, or when noises are included in a demodulated signal. Thus, it is possible to reduce probability of signal receiving error, and inability of receiving signals, which ensures highly reliable signal-receiving.

The above and other objects and advantageous features of the present invention will be made apparent from the following description made with reference to the accompany-

DESCRIPTION OF THE PREFERRED EMBODIMENTS

[First Embodiment]

Figure 1:
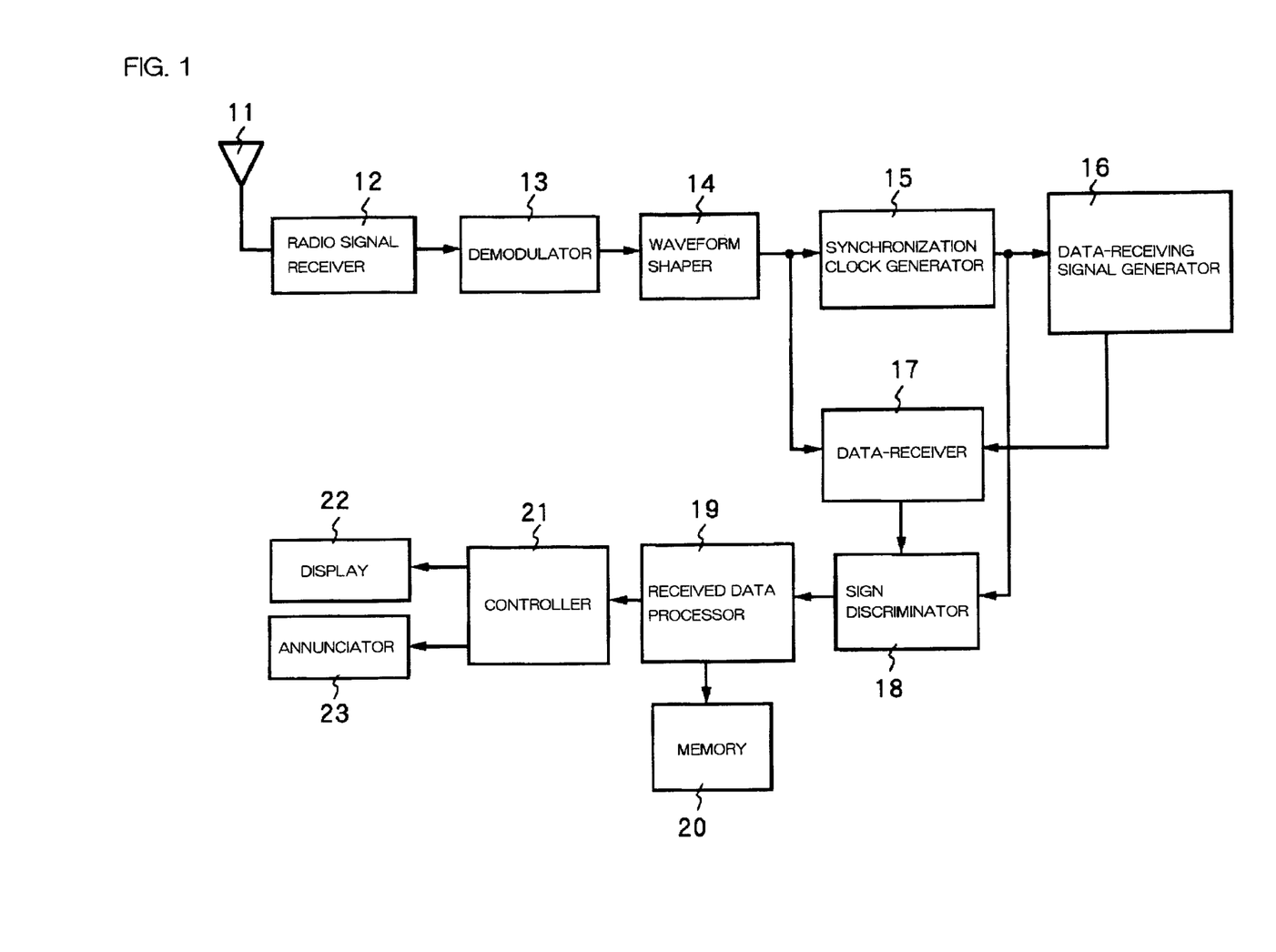
FIG. 1 is a block diagram of a selective calling radio-receiver in accordance with the first embodiment of the present invention.

FIG. 1 is a block diagram of a selective calling radio-receiver in accordance with the first embodiment of the present invention.

As illustrated in FIG. 1, the selective calling radio-receiver is comprised of an antenna 11 which receives a selective calling radio signal therethrough, a radio signal receiver 12 which amplifies the received selective calling radio signal in high frequency, and coverts the signal in a frequency, a demodulator 13 which demodulates the received selective calling radio signal, a waveform-shaper 14 which shapes a waveform of a demodulation signal transmitted from the demodulator 13, a synchronization clock generator 15 which generates a synchronization clock in synchronization with a signal transmitted from the waveform shaper 14, a data-receiving signal generator 16 which generates a data-receiving timing signal based on the synchronization clock, a data receiver 17 which receives data in accordance with the data-receiving timing signal, a sign discriminator 18 which discriminates a sign of received data, a received data processor 19 which receives a result of sign discrimination from the sign discriminator, and processes the received data, a memory 20 storing therein message signals transmitted from the received data processor 19, a controller 21, a display 22 in which message signals are displayed, and an annunciator 23.

The controller 21 controls the display 22 and the annunciator 23 in accordance with the message signals transmitted from the received data processor 19.

An operation of the selective calling radio receiver in accordance with the first embodiment is explained hereinbelow.

A selective calling radio signal having been transmitted from a base station (not illustrated) is received at the radio signal receiver 12 through the antenna 11. Then, the received selective calling radio signal is amplified in high frequency, and converted in a frequency so that the signal can be demodulated. The selective calling radio signal is transmitted to, and demodulated in the demodulator 13. As a result, a frequency-voltage conversion is accomplished, and the demodulator 13 transmits a demodulated signal.

The demodulated signal is waveform-shaped in the waveform shaper 14 into a signal having rectangular waveforms. The thus waveform-shaped signal is transmitted to both the synchronization clock generator 15 and the data-receiver 17.

The synchronization clock generator 15 generates a synchronization clock in synchronization with the signal having rectangular waveforms, transmitted from the waveform shaper 14, and transmits the synchronization clock to both the data-receiving signal generator 16 and the sign discriminator 18.

The data-receiving signal generator 16 generates a data-receiving signal in accordance with the synchronization clock transmitted from the synchronization clock generator 15. The thus generated data-receiving signal is transmitted to the data-receiver 17, which in turn receives the signal having rectangular waveforms from the waveform shaper 14 in accordance with a timing of the data-receiving signal, and transmits the received signal to the sign discriminator 18.

The sign discriminator 18 discriminates a sign of the signal transmitted from the data-receiver 17, at every symbol of the signal. The result of sign discrimination is transmitted to the received data processor 19.

The received data processor 19 converts the received data into letters, and stores the thus obtained letters in the memory 20, and further transmits the letters to the controller 21. The controller 21 displays the received letters in the display 22, and at the same time, transmits a signal to the annunciator 23 to thereby cause the annunciator 23 to make sound for annunciation to an operator.

The operation of the selective calling radio receiver in accordance with the first embodiment is explained in detail with reference to FIG. 2. Herein, it is assumed that a selective calling radio signal to be received by the radio signal receiver 12 is demodulated in accordance with binary frequency shift keying (FSK).

A selective calling radio signal having been amplified in high frequency and converted in a frequency at the radio signal receiver 12 is demodulated in the demodulator 13. The thus demodulated selective calling radio signal has such a waveform as illustrated in FIG. 2(a). A symbol in FIG. 2(a) is a minimum unit for modulation, and is equivalent to one bit in binary FSK. The demodulated selective calling radio signal is transmitted to the waveform shaper 14, and compared to a threshold value indicated as "I" in FIG. 2(a). As a result, the demodulated selective calling radio signal is shaped into a signal having a rectangular waveform, as illustrated in FIG. 2(b).

Figure 3:
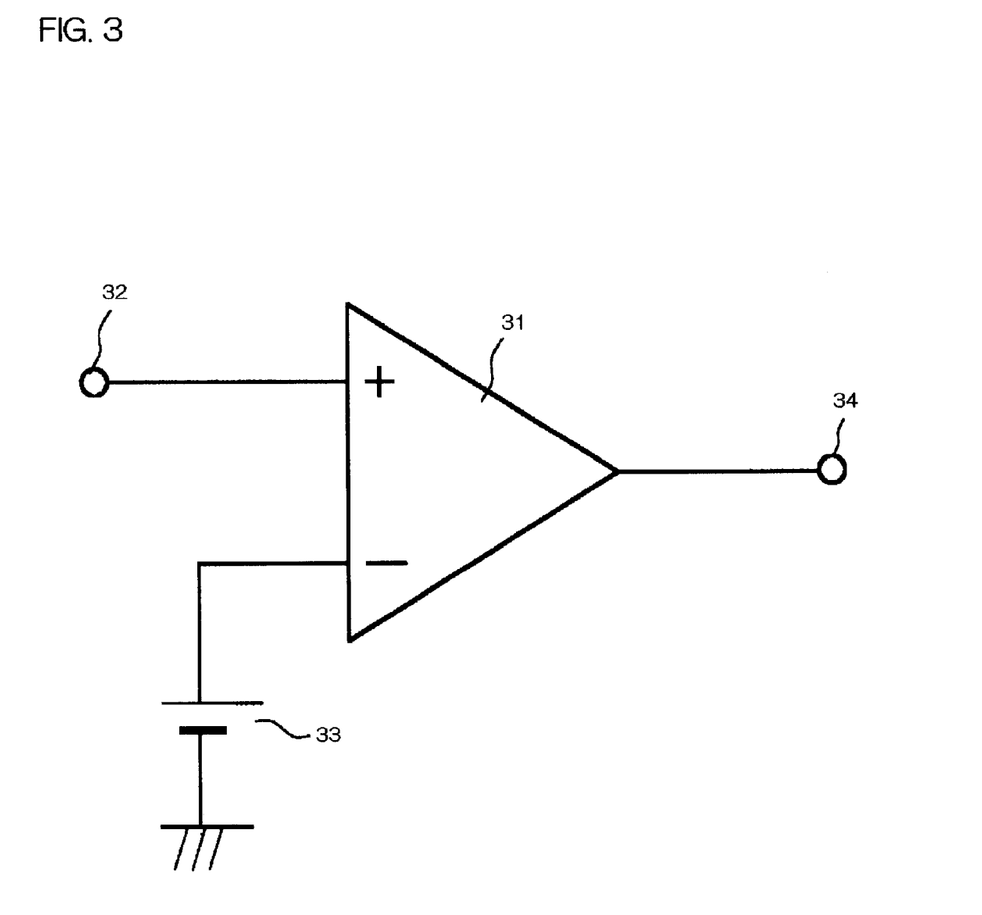
FIG. 3 is a circuit diagram of an example of a waveform-shaping circuit constituting the selective calling radio-receiver in accordance with the first embodiment.

FIG. 3 is a block diagram of an example of the waveform shaper 14. As illustrated in FIG. 3, the waveform shaper 14 is comprised of an operational amplifier 31 acting as a comparator, and a reference voltage source 33.

Figure 2:
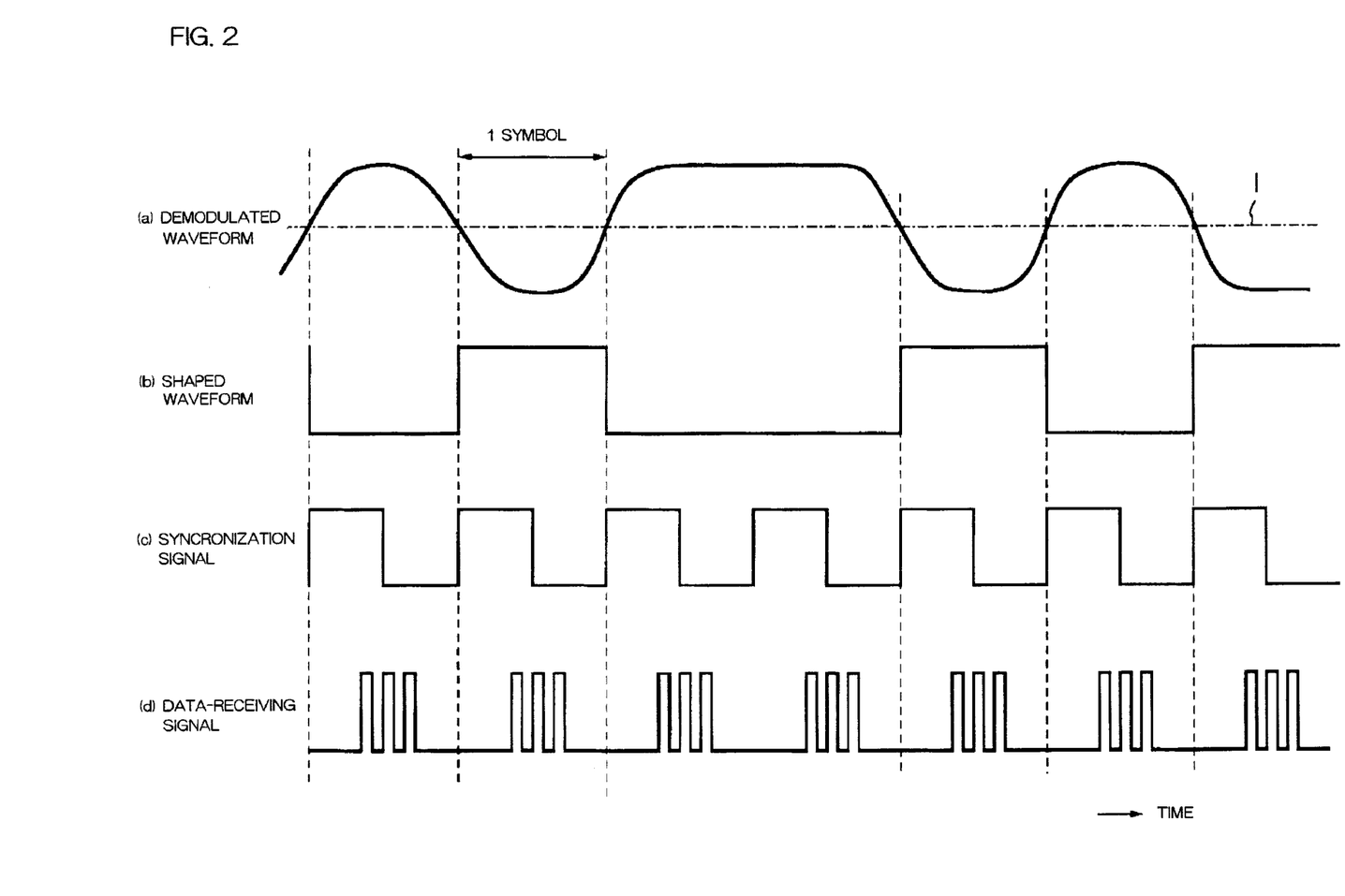
FIG. 2 is a timing chart for explaining an operation of the selective calling radio-receiver in accordance with the first embodiment of the present invention.

The above-mentioned demodulated signal is input into a non-inversion input terminal of the operational amplifier 31 through a first terminal 32, and a reference voltage, which is equivalent to the threshold value indicated as "I" in FIG. 2(a), generated from the reference voltage source 33 is input into an inversion input terminal.

The operational amplifier 31 compares the demodulated signal to the reference voltage. If the demodulated signal is greater in level than the reference voltage, the operational amplifier 31 generates a high level signal as waveform shaping signal, and if the demodulated signal is smaller in level than the reference voltage, the operational amplifier 31 generates a low level signal as a waveform shaping signal. As a result, the waveform shaper 14 outputs a signal having such a rectangular waveform as illustrated in FIG. 2(b).

The signal having a rectangular waveform, transmitted from the waveform shaper 14, is regenerated in the synchronization clock generator 15 as a synchronization signal or clock having a rectangular waveform which has a period equal to a symbol. As illustrated in FIG. 2(c), the thus regenerated synchronization signal has rise edges at every level turning point of the demodulated signal.

The data-receiving signal generator 16 generates a plurality of pulse signals, as a data-receiving signal, before and behind fall edges of the synchronization signal.

In the instant embodiment, as illustrated in FIG. 2(d), the data-receiving signal is comprised of a burst wave including a plurality of pulse rows each of which is generated at every symbol. Each of the pulse rows includes three pulses, one of which is generated almost in synchronization with each of the fall edges of the synchronization signal, and the remainder of which are generated before and behind each of the fall edges of the synchronization signal.

The data-receiver 17 receives the signal from the waveform shaper 14 at each of the rise edges of the data-receiving signal. Since the synchronization signal includes three pulses in one symbol, the data-receiver 17 receives three data in one symbol.

The sign discriminator 18 determines a sign of a symbol in which the sign discriminator 18 receives three data. A sign is determined by majority rule. The data-receiver 17 assigns "1" to received data, if the data has a high level, and assigns "0" to received data, if the data has a low level. If "1" is greater in number than "0" among signs of the received three data, the sign discriminator 18 assigns "1" to the three data. If "0" is greater in number than "1" among signs of the received three data, the sign discriminator 18 assigns "0" to the three data.

An example of a relation between received data and discrimination results is shown in Table 1 wherein three data is received in one symbol.

TABLE 1

| Received Data | | | Discrimination Results |
| --- | --- | --- | --- |
| 1 | 1 | 1 | 1 |
| 1 | 1 | 0 | 1 |
| 1 | 0 | 1 | 1 |
| 0 | 1 | 1 | 1 |
| 1 | 0 | 0 | 0 |
| 0 | 1 | 0 | 0 |
| 0 | 0 | 1 | 0 |
| 0 | 0 | 0 | 0 |

Data a sign of which has been discriminated by the sign discriminator 18 per a symbol is transmitted to the received data processor 19 per a symbol in accordance with the synchronization signal.

Based on the sign discrimination results transmitted from the sign discriminator 18, the received data processor 19 extracts a calling number or an address for data-receiving. Then, the received data processor 19 compares the thus obtained address to an address which is in advance assigned to the selective calling radio-receiver. If they are coincident with each other, the received data processor 19 converts a message signal following the address in the received data, into a signal indicative of character or letter data.

The thus obtained character or letter data signal is transmitted to the controller 21.

The controller 21 displays the character or letter indicated in the received character or letter data signal, in the display 22. The controller 21 also operates the annunciator 23 to inform a user of the selective calling radio-receiver that a call has been received. For instance, the annunciator 23 makes sound or oscillation.

In accordance with the instant embodiment, received data is dealt as three data per a symbol term, and a sign of the three data is determined by majority decision rule. Hence, it is possible to accurately receive a selective calling radio signal even when there bit synchronization is not established due to phasing and/or a difference in delay in transmitted signals in an overlapping area, when data is unstably received, or when noises are included in a demodulated signal. Thus, it is possible to reduce probability of signal receiving error, and inability of receiving signals, which ensures highly reliable signal-receiving.

[Second Embodiment]

In the second embodiment, a selective calling radio signal is a four-valued FSK signal. The radio signal receiver 12 and the demodulator 13 in the selective calling radio-receiver in accordance with the second embodiment operates in the same manner as those in the first embodiment wherein a selective calling radio signal is a binary FSK signal.

For instance, a typical four-valued FSK demodulation circuit is disclosed in Japanese Unexamined Patent Publication No. 8-237314, and a multi-valued FSK demodulation window comparator is disclosed in Japanese Unexamined Patent Publication No. 10-93641.

An operation of the selective calling radio-receiver in accordance with the second embodiment is detailed hereinbelow with reference to FIG. 4.

Figure 4:
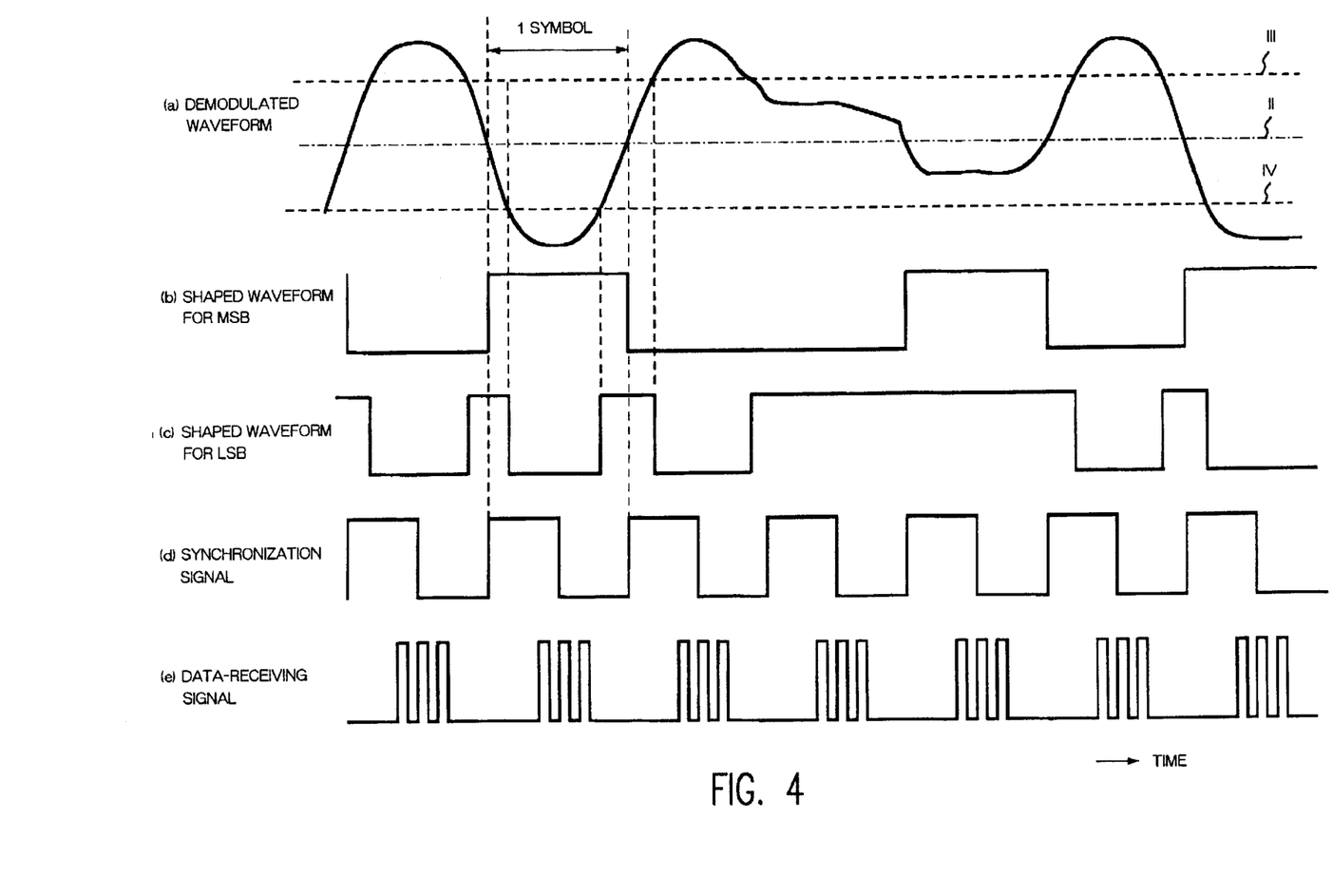
FIG. 4 is another timing chart for explaining an operation of the selective calling radio-receiver in accordance with the first embodiment of the present invention.

A demodulated four-valued FSK signal has such a waveform as illustrated in FIG. 4(a). A symbol illustrated in FIG. 4(a) is a minimum unit for modulation, and corresponds to 2-bit data in a four-valued FSK signal.

Figure 5:
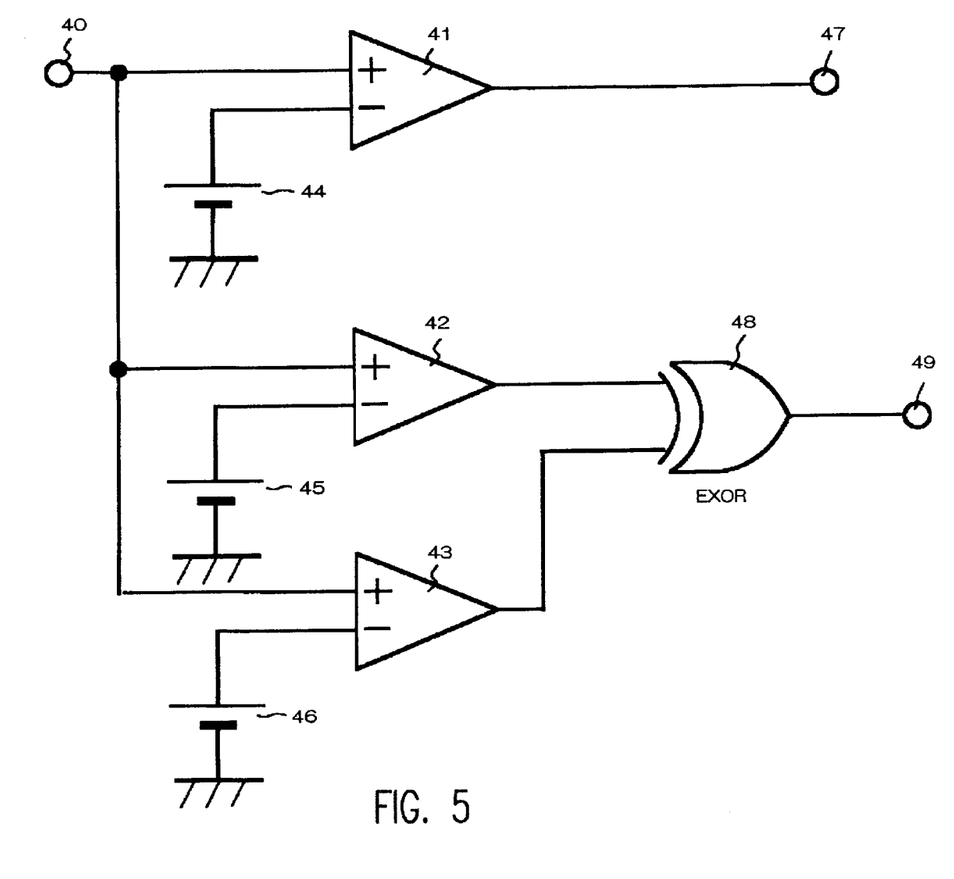
FIG. 5 is a circuit diagram of another example of a waveform-shaping circuit constituting the selective calling radio-receiver in accordance with the first embodiment.

The demodulated signal is waveform-shaped in the waveform shaper 14. As illustrated in FIG. 5, the waveform shaper 14 used for a four-valued FSK signal is comprised of first to third operational amplifier 41, 42, and 43 each acting as a comparator, first to third reference voltage sources 44, 45 and 46, and 2-input exclusive OR (EXOR) circuit 48. The waveform shaper 14 carries out waveform shaping for MSB output and waveform shaping for LSB output.

With reference to FIG. 5, a four-valued FSK demodulated signal is input into the first to third operational amplifiers 41, 42 and 43 through an input terminal 40. The first operational amplifier 41 compares the four-valued FSK demodulated signal to a first reference voltage generated from the first reference voltage source 44. The first reference voltage corresponds to a level indicated as "II" in FIG. 4(a). If the demodulated signal is greater in level than the first reference voltage, the first operational amplifier 41 transmits a high level signal to an output terminal 47, whereas if the demodulated signal is smaller in level than the first reference voltage, the first operational amplifier 41 transmits a low level signal to the output terminal 47. The thus transmitted signal is a signal for waveform shaping for MSB, and has such a waveform as illustrated in FIG. 4(b).

The four-valued FSK demodulated signal is also introduced into non-inversion input ports of the second and third operational amplifiers 42 and 43 through the input terminal 40.

The second operational amplifier 42 compares the four-valued FSK demodulated signal to a second reference voltage generated from the second reference voltage source 45. The second reference voltage corresponds to a level indicated as "III" in FIG. 4(a), and hence, is greater than the first reference voltage indicated as "II". If the demodulated signal is greater in level than the second reference voltage, the second operational amplifier 42 transmits a high level signal to the EXOR circuit 48, whereas if the demodulated signal is smaller in level than the second reference voltage, the second operational amplifier 42 transmits a low level signal to the EXOR circuit 48.

The third operational amplifier 43 compares the four-valued FSK demodulated signal to a third reference voltage generated from the third reference voltage source 46. The third reference voltage corresponds to a level indicated as "IV" in FIG. 4(a), and hence, is smaller than the first reference voltage indicated as "II". If the demodulated signal is greater in level than the third reference voltage, the third operational amplifier 43 transmits a high level signal to the EXOR circuit 48, whereas if the demodulated signal is smaller in level than the third reference voltage, the third operational amplifier 43 transmits a low level signal to the EXOR circuit 48.

The EXOR circuit 48 transmits a high level signal only when one of output signals transmitted from the second and third operational amplifiers 42 and 43 is a low level signal, and transmits a low level signal when both of output signals transmitted from the second and third operational amplifiers 42 and 43 are low or high level signals. As a result, a waveform shaping signal for LSB, having a low level, is transmitted to an output terminal 49 when the demodulated signal transmitted through the input terminal 40 has a level greater than the second reference voltage or smaller than the third reference voltage, whereas a waveform shaping signal for LSB, having a high level, is transmitted to the output terminal 49 when the demodulated signal has a level smaller than the second reference voltage, but greater than the third reference voltage.

That is, when the demodulated signal having such a waveform as illustrated in FIG. 4(a) is input into the input terminal 40, the signal for LSB, having such a waveform as illustrated in FIG. 4(c), is obtained at the output terminal 49.

The waveform shaping signal for MSB is transmitted to the synchronization clock generator 15, and is regenerated as such a synchronization signal as illustrated in FIG. 4(d), which is synchronized with received signals, and which has rise edges at the same timing as level turning points of the waveform shaping signal for MSB. The thus generated synchronization signal has a cycle equal to one symbol term.

The data-receiving signal generator 16 generates a plurality of pulse signals, as a data-receiving signal, before and behind each of fall edges of the synchronization signal.

In the second embodiment, as illustrated in FIG. 4(e), the data-receiving signal is comprised of a burst wave including a plurality of pulse rows each of which is generated at every symbol. Each of the pulse rows includes three pulses, one of which is generated almost in synchronization with each of the fall edges of the synchronization signal, and the remainder of which are generated before and behind each of the fall edges of the synchronization signal.

The data-receiver 17 separately receives the waveform shaping signal for MSB and the waveform shaping signal for LSB from the waveform shaper 14 at each of the rise edges of the data-receiving signal. Since the synchronization signal includes three pulses in one symbol, the data-receiver 17 receives three data in one symbol in both the waveform shaping signals for MSB and LSB.

The sign discriminator 18 determines a sign of a symbol in which the sign discriminator 18 receives three data, for both the waveform shaping signals for MSB and LSB. A sign is determined by majority rule, similarly to the first embodiment. The data-receiver 17 assigns "1" to received data, if the data has a high level, and assigns "0" to received data, if the data has a low level. If "1" is greater in number than "0" among signs of the received three data, the sign discriminator 18 assigns "1" to the three data. If "0" is greater in number than "1" among signs of the received three data, the sign discriminator 18 assigns "0" to the three data. The discrimination like this is carried out separately for the waveform shaping signals for MSB and LSB.

An example of a relation between received data and discrimination results is shown in Table 2 wherein three data is received in one symbol.

[TABLE 2]

| LSB | | | Discrimination Results | MSB | | | Discrimination Results |
|---|---|---|---|---|---|---|---|
| 1 | 1 | 1 | 1 | 1 | 1 | 1 | 1 |
| 1 | 1 | 0 | 1 | 1 | 1 | 0 | 1 |
| 1 | 0 | 1 | 1 | 1 | 0 | 1 | 1 |
| 0 | 1 | 1 | 1 | 0 | 1 | 1 | 1 |
| 1 | 0 | 0 | 0 | 1 | 0 | 0 | 0 |
| 0 | 1 | 0 | 0 | 0 | 1 | 0 | 0 |
| 0 | 0 | 1 | 0 | 0 | 0 | 1 | 0 |
| 0 | 0 | 0 | 0 | 0 | 0 | 0 | 0 |

Data a sign of which has been discriminated separately for the signals for MSB and LSB by the sign discriminator 18 per a symbol is transmitted to the received data processor 19 per a symbol in accordance with the synchronization signal.

Thereafter, data is obtained in the same manner as the above-mentioned first embodiment. Then, the obtained message is displayed in the display 22, and the annunciator 23 informs a user that a call has been received.

Figure 8:
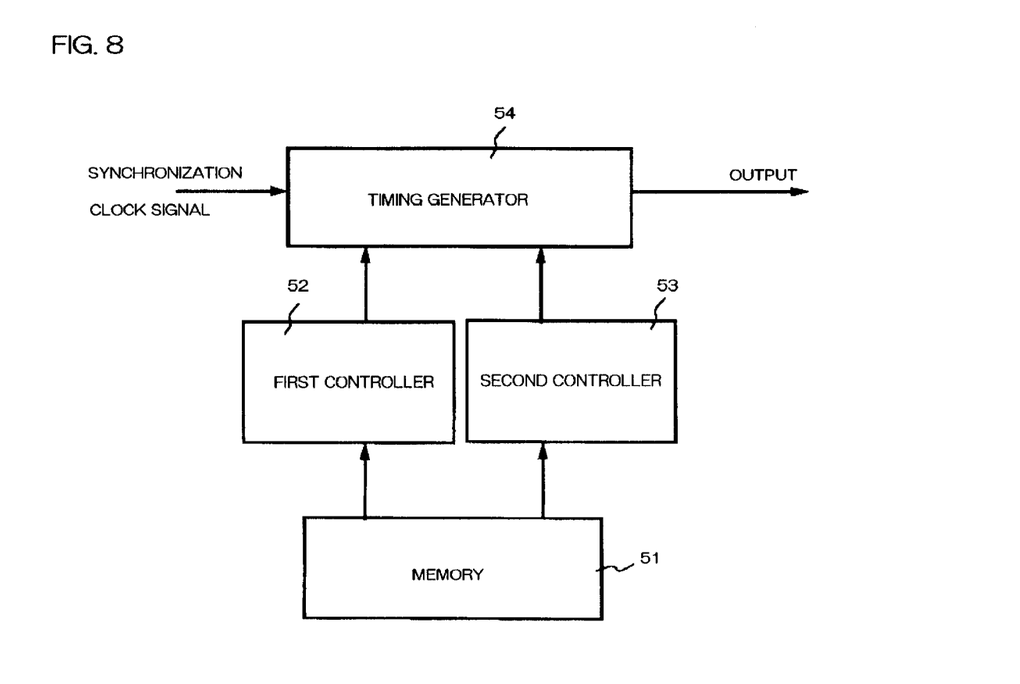
FIG. 8 is a block diagram of an example of a timing signal generator.

FIG. 8 is a block diagram of an example of the data-receiving signal generator 16. The data-receiving signal generator 16 can vary a timing at which data is to be received, and also vary the number of data to be received in a symbol. The illustrated data-receiving signal generator 16 is comprised of a memory 51, a first controller 52 which varies a timing at which data is received, a second controller 53 which varies the number of data to be received, and a timing generator 54.

The memory 51 stores a timing at which data is received, and the number of data to be received per a symbol. Based on those data, a timing at which data is received and the number of data are determined.

The timing generator 54 receives the synchronization signal or clock from the synchronization clock generator 15, and generates a data-receiving signal in synchronization with the synchronization signal. The data-receiving signal includes pulses each of which has a width and a cycle both determined in accordance with data transmitted from the first controller 52. The number of pulses in the data-receiving signal is determined in accordance with data transmitted from the second controller 53.

Figure 6:
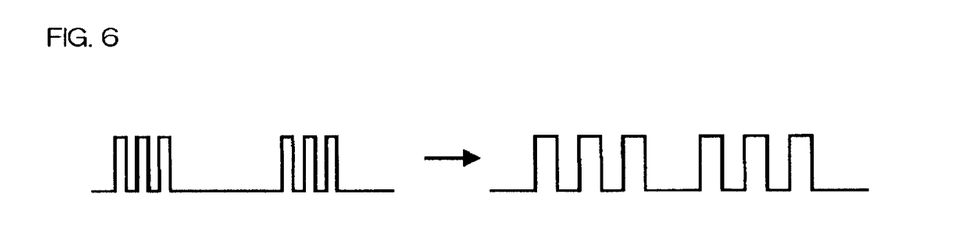
FIG. 6 illustrates waveforms of a data-receiving signal in which a pulse width is varied.

The first controller 52 varies a width of a pulse of the data-receiving signal, as illustrated in FIG. 6, in accordance with data about a timing at which data is received, transmitted from the memory 51. As a result, the timing generator 54 transmits the data-receiving signal including pulses each having a varied width. Thus, a timing at which data is received is varied.

In FIG. 6, a width of a pulse is doubled to thereby vary a timing at which data is received. However, it should be noted that only a cycle of a pulse may be varied instead of varying a width of a pulse.

The second controller 53 transmits a signal indicative of the number of data to be received, to the timing generator 54, based on data indicating the number of data to be received per a symbol, transmitted from the memory 51.

Figure 7:
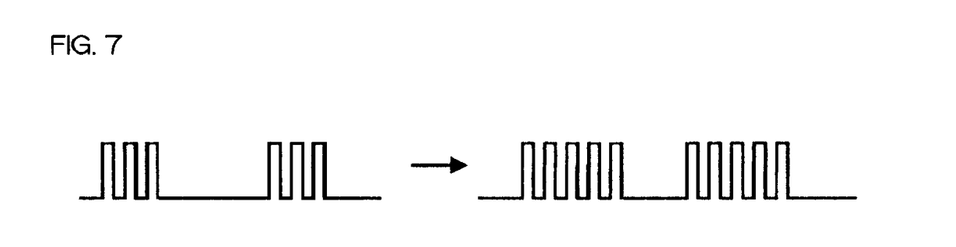
FIG. 7 illustrates waveforms of a data-receiving signal in which the number of pulses is varied.

As a result, as illustrated in FIG. 7, the number of pulses per a symbol in the data-receiving signal can be increased from 3 to 5, for instance.

Though the data-receiving signal generator 16 illustrated in FIG. 8 is designed to include both the first and second controllers 52 and 53, it should be noted that the data-receiving signal generator 16 may be designed to include one of the first and second controllers 52 and 53.

Figure 9:
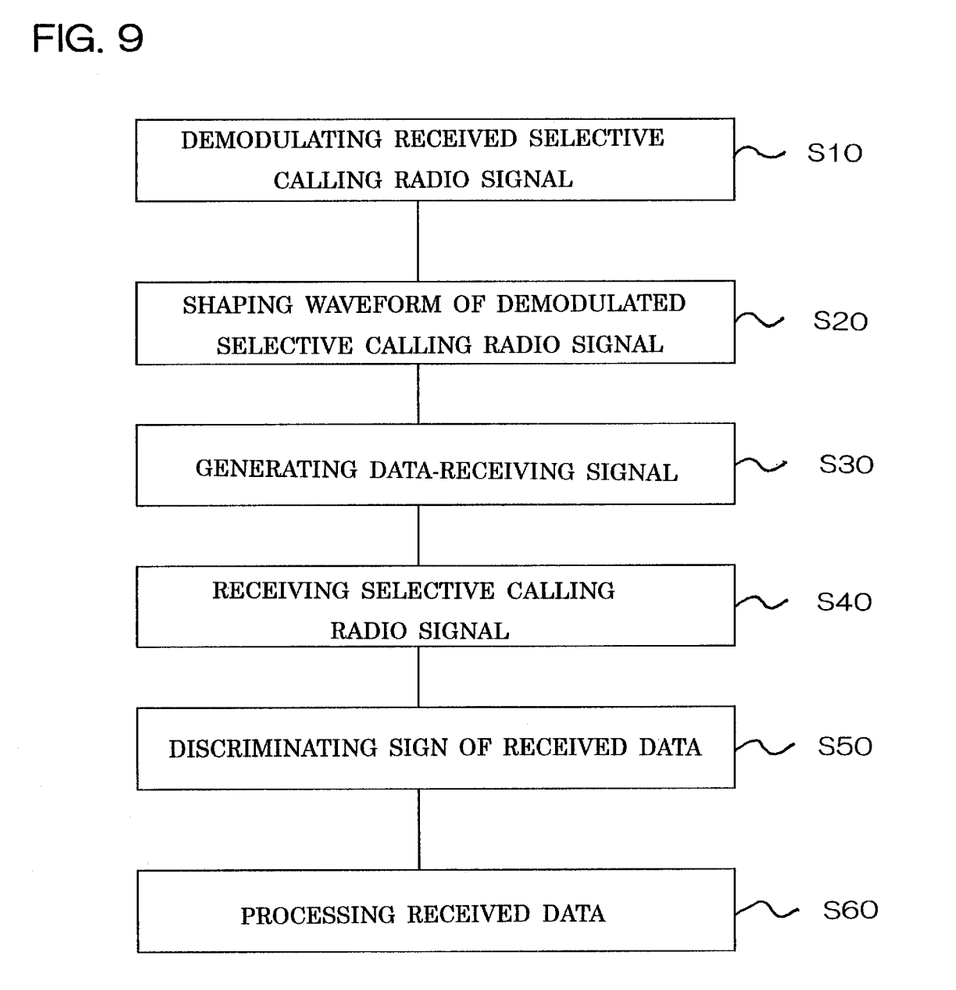
FIG. 9 is a flow chart of a method of receiving a selective calling radio signal in accordance with an embodiment of the present invention.

FIG. 9 is a flow chart showing steps of a method of receiving a selective calling radio signal in a selective calling radio receiver.

First, a received selective calling radio signal is demodulated in step S10, for instance, by means of the demodulator 13.

Then, a waveform of the thus demodulated selective calling radio signal is shaped in step S20, for instance, by means of the waveform shaper 14.

Then, a synchronization clock is generated, for instance, by means of the synchronization clock generator 15. Then, a data-receiving signal is generated in synchronization with the demodulated signal in step S30, for instance, by means of the data-receiving signal generator 16. The data-receiving signal has a plurality of pulses per a symbol term.

Then, the signal having a waveform having been shaped in step S20 is received in accordance with a timing of the data-receiving signal, in step S40.

Then, a sign of the thus received data is discriminated at every symbol in step S50, for instance, by means of the sign discriminator 18.

Then, the received data is processed in step S60. Specifically, data is converted into letters, which are stored in a memory and displayed in a display screen. In addition, it is annunciated to a user that a call has been received.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-148734 filed on May 29, 1998 including specification, claims, drawings and summary is incorporated herein by reference in its entirety.

What is claimed is:

1. A selective calling radio-receiver comprising:
   (a) a demodulator demodulating a received selective calling radio signal;
   (b) a waveform-shaper shaping waveform of a demodulation signal transmitted from said demodulator;
   (c) a data-receiving signal generator generating a data-receiving signal which is in synchronization with said modulation signal having a waveform having been shaped by said waveform-shaper, and which has a plurality of pulses per a symbol term;
   (d) a data-receiver receiving said demodulation signal at every pulse of said data-receiving signal;
   (e) a sign discriminator discriminating a sign of received data at every symbol, based on data having been received in said data-receiver; and
   (f) a processor processing said received data a sign of which has been discriminated by said sign discriminator.

2. The selective calling radio-receiver as set forth in claim 1, wherein said sign discriminator determines a sign in the greatest number among signs of data having been received from said data-receiver in a symbol term, as a sign of data having been received in said symbol term.

3. The selective calling radio-receiver as set forth in claim 1, wherein said data-receiving signal generator includes:
   (c1) a synchronization clock generator generating a synchronization signal having a rectangular waveform produced in every symbol period, based on said demodulation signal having a waveform having been shaped by said waveform-shaper; and
   (c2) a timing signal generator generating a pulse row as said data-receiving signal in a certain period of time around a time associated with a level-turning point of said synchronization signal in a symbol term, said pulse row including a plurality of pulses.

4. The selective calling radio-receiver as set forth in claim 3, wherein said timing signal generator includes:
   (c21) a memory storing therein at least one of information about a timing at which data is received and information about the number of data;
   (c22) a first controller varying said timing stored in said memory; and
   (c23) a timing generator generating said data-receiving signal having a pulse width and a pulse period both determined in accordance with said information.

5. The selective calling radio-receiver as set forth in claim 3, wherein said timing signal generator includes:
   (c21) a memory storing therein at least one of information about a timing at which data is received and information about the number of data;
   (c22) a second controller varying said number of data stored in said memory; and
   (c23) a timing generator generating said data-receiving signal having a pulse by the number determined in accordance with said information.

6. The selective calling radio-receiver as set forth in claim 1, wherein said selective calling radio signal is a binary FSK signal, and
   wherein said waveform-shaper includes:
   (b1) a reference voltage source generating a reference voltage; and
   (b2) a comparator comparing said demodulation signal to said reference voltage in level to thereby form a signal having a rectangular waveform, and outputting said signal as a demodulation signal having a shaped waveform.

7. The selective calling radio-receiver as set forth in claim 1, wherein said selective calling radio signal is a four-valued FSK signal, and
   wherein said waveform-shaper includes:
   (b1) first, second and third reference voltage sources generating first, second and third reference voltages having different levels from one another;
   (b2) a first comparator comparing said demodulation signal in level to said first reference voltage to thereby obtain a first signal having a rectangular waveform, and outputting said first signal for MSB as a demodulation signal having a shaped waveform;
   (b3) a second comparator comparing said demodulation signal in level to said second reference voltage, said second reference voltage being greater in level than said first reference voltage;

(b4) a third comparator comparing said demodulation signal in level to said third reference voltage, said third reference voltage being smaller in level than said first reference voltage; and (b5) a logic circuit transmitting a second signal for LSB as a demodulation signal having a shaped waveform, said second signal having a first level when said demodulation signal transmitted from said demodulator has a level intermediate between said second and third reference voltages, and having a second level when said demodulation signal transmitted from said demodulator has a level greater than said second reference voltage or smaller than said third reference voltage, said data-receiver separately receiving said first and second signals for every pulse of said data-receiving signal.

8. A method of receiving a selective calling radio signal, comprising the steps of:

(a) demodulating a received selective calling radio signal;

(b) shaping a waveform of the thus demodulated selective calling radio signal;

(c) generating a data-receiving signal which is in synchronization with said demodulated selective calling radio signal and which has a plurality of pulses per a symbol term;

(d) receiving said selective calling radio signal at every pulse of said data-receiving signal;

(e) discriminating a sign of received data at every symbol, based on said selective calling radio signal having been received in said step (d); and (f) processing said received data a sign of which has been discriminated in said step (e).

9. The method as set forth in claim 8, wherein a sign in the greatest number among signs of data having been received in a symbol term is determined as a sign of data having been received in said symbol term, in said step (e).

10. The method as set forth in claim 8, wherein said step (c) includes:

(c1) generating a synchronization signal having a rectangular waveform produced in every symbol period; and (c2) generating a pulse row as said data-receiving signal in a certain period of time around a time associated with a level-turning point of said synchronization signal in a symbol term, said pulse row including a plurality of pulses.

11. The method as set forth in claim 10, wherein said step (c2) includes:

(c21) storing a t least one of information about a timing at which data is received and information about the number of data;

(c22) varying said timing; and (c23) generating said data-receiving signal having a pulse width and a pulse period both determined in accordance with said information.

12. The method as set forth in claim 10, wherein said step (c2) includes:

(c21) storing at least one of information about a timing at which data is received and information about the number of data;

(c22) varying said number of data; and (c23) generating said data-receiving signal having a pulse by the number determined in accordance with said information.

13. The method as set forth in claim 8, wherein said selective calling radio signal is a binary FSK signal, and wherein said step (b) includes:

(b1) generating a reference voltage; and (b2) comparing said demodulated selective calling radio signal to said reference voltage in level to thereby form a signal having a rectangular waveform, and outputting said signal as a demodulation signal having a shaped waveform.

14. The method as set forth in claim 8, wherein said selective calling radio signal is a four-valued FSK signal, and wherein said step (b) includes:

(b1) generating first, second and third reference voltages having different levels from one another;

(b2) comparing said selective calling radio signal in level to said first reference voltage to thereby obtain a first signal having a rectangular waveform, and outputting said first signal for MSB as a demodulation signal having a shaped waveform;

(b3) comparing said selective calling radio signal in level to said second reference voltage, said second reference voltage being greater in level than said first reference voltage;

(b4) comparing said selective calling radio signal in level to said third reference voltage, said third reference voltage being smaller in level than said first reference voltage; and (b5) transmitting a second signal for LSB as a demodulation signal having a shaped waveform, said second signal having a first level when said demodulation signal has a level intermediate between said second and third reference voltages, and having a second level when said demodulation signal has a level greater than said second reference voltage or smaller than said third reference voltage, said first and second signals being separately received for every pulse of said data-receiving signal.

* * * * *